(12) United States Patent
Tucker

(10) Patent No.: US 10,784,545 B2
(45) Date of Patent: Sep. 22, 2020

(54) SUBMERGED CELL MODULAR BATTERY SYSTEM

(71) Applicant: XING POWER INC., Victoria, Mahe (SC)

(72) Inventor: Kareem Azizi Tucker, Berkeley, CA (US)

(73) Assignee: XING POWER INC., Victoria (SC)

( * ) Notice: Subject to any disclaimer, the term of this patent is extended or adjusted under 35 U.S.C. 154(b) by 453 days.

(21) Appl. No.: 15/080,882

(22) Filed: Mar. 25, 2016

(65) Prior Publication Data

US 2017/0279172 A1    Sep. 28, 2017

(51) Int. Cl.

| | |
|---|---|
| *H01M 10/6568* | (2014.01) |
| *H01M 2/20* | (2006.01) |
| *H01M 2/10* | (2006.01) |
| *H01M 10/613* | (2014.01) |
| *H01M 10/625* | (2014.01) |
| *H01M 10/6567* | (2014.01) |
| *H01M 10/42* | (2006.01) |

(52) U.S. Cl.
CPC ..... *H01M 10/6568* (2015.04); *H01M 2/1077* (2013.01); *H01M 2/206* (2013.01); *H01M 10/613* (2015.04); *H01M 10/625* (2015.04); *H01M 10/6567* (2015.04); *H01M 2010/4271* (2013.01); *H01M 2220/20* (2013.01)

(58) Field of Classification Search
CPC ............. H01M 10/613; H01M 10/625; H01M 10/6567; H01M 10/6568; H01M 2010/4271; H01M 2220/20; H01M 2/1077; H01M 2/206
See application file for complete search history.

(56) References Cited

U.S. PATENT DOCUMENTS

| | | | | |
|---|---|---|---|---|
| 6,106,972 | A * | 8/2000 | Kokubo | B60L 11/1874 429/120 |
| 8,383,260 | B2 | 2/2013 | Essinger et al. | 429/120 |
| 8,435,668 | B2 | 5/2013 | Kumar et al. | 429/162 |
| 2003/0082439 | A1* | 5/2003 | Sakakibara | H01M 2/0202 429/120 |
| 2004/0050414 | A1* | 3/2004 | Oogami | H01M 2/0207 136/249 |
| 2007/0046259 | A1* | 3/2007 | Shimizu | H01M 2/105 320/116 |
| 2009/0142653 | A1 | 6/2009 | Okada et al. | 429/120 |
| 2011/0027631 | A1* | 2/2011 | Koenigsmann | H01M 2/1077 429/62 |
| 2012/0013340 | A1* | 1/2012 | Yuasa | H01M 2/206 324/430 |

(Continued)

FOREIGN PATENT DOCUMENTS

KR    102014005651    9/2014    ........... H01M 10/65

*Primary Examiner* — Adam A Arciero
(74) *Attorney, Agent, or Firm* — Hamre, Schumann, Mueller & Larson, P.C.

(57) ABSTRACT

An apparatus includes a plurality of battery cells and a case. The case may be configured to hold the plurality of battery cells. The case generally has at least a first port and a second port configured to allow a cooling liquid to flow through the case with the battery cells submerged in the cooling liquid. The case is generally configured to interlock with one or more other cases to electrically and physically connect the one or more cases into a battery block or battery pack.

16 Claims, 10 Drawing Sheets

(56) References Cited

U.S. PATENT DOCUMENTS

| | | | |
|---|---|---|---|
| 2013/0059185 A1* | 3/2013 | Whitacre | H01M 2/1077 |
| | | | 429/99 |
| 2013/0122331 A1 | 5/2013 | McDonald | 429/50 |
| 2013/0136969 A1* | 5/2013 | Yasui | H01M 2/0277 |
| | | | 429/99 |
| 2016/0064704 A1 | 3/2016 | Schmidt et al. | |

* cited by examiner

SECTION A-A

SUBMERGED CELL MODULAR BATTERY SYSTEM

FIELD OF THE INVENTION

The present invention relates to electric vehicle batteries generally and, more particularly, to a method and/or architecture for a submerged cell modular battery system.

BACKGROUND OF THE INVENTION

Battery cells such as lithium-ion battery cells generate heat during operation and during recharging. When overheated or otherwise exposed to high-temperature environments, undesirable effects can impact the operation of lithium-ion batteries. In extreme cases, overheated lithium-ion batteries are known to suffer catastrophic failure such as catching fire. Cooling systems are typically employed with lithium-ion battery packs to mitigate against the undesirable overheating conditions. Conventional cooling systems include air to air cooling, cooling plates or fins sandwiched between individual battery cells within a battery pack, heat sinks, and sealed chambers with channels through which convection currents in a coolant transfer heat from the battery cells to a cooling element.

It would be desirable to implement a submerged cell modular battery system.

SUMMARY OF THE INVENTION

The present invention concerns an apparatus including a plurality of battery cells and a case. The case may be configured to hold the plurality of battery cells. The case generally has at least a first port and a second port configured to allow a cooling liquid to flow through the case with the battery cells submerged in the cooling liquid. The case is generally configured to interlock with one or more other cases to electrically and physically connect the one or more cases into a battery block or battery pack.

BRIEF DESCRIPTION OF THE DRAWINGS

Embodiments of the present invention will be apparent from the following detailed description and the appended claims and drawings in which:

DETAILED DESCRIPTION OF THE PREFERRED EMBODIMENTS

Figure 1:
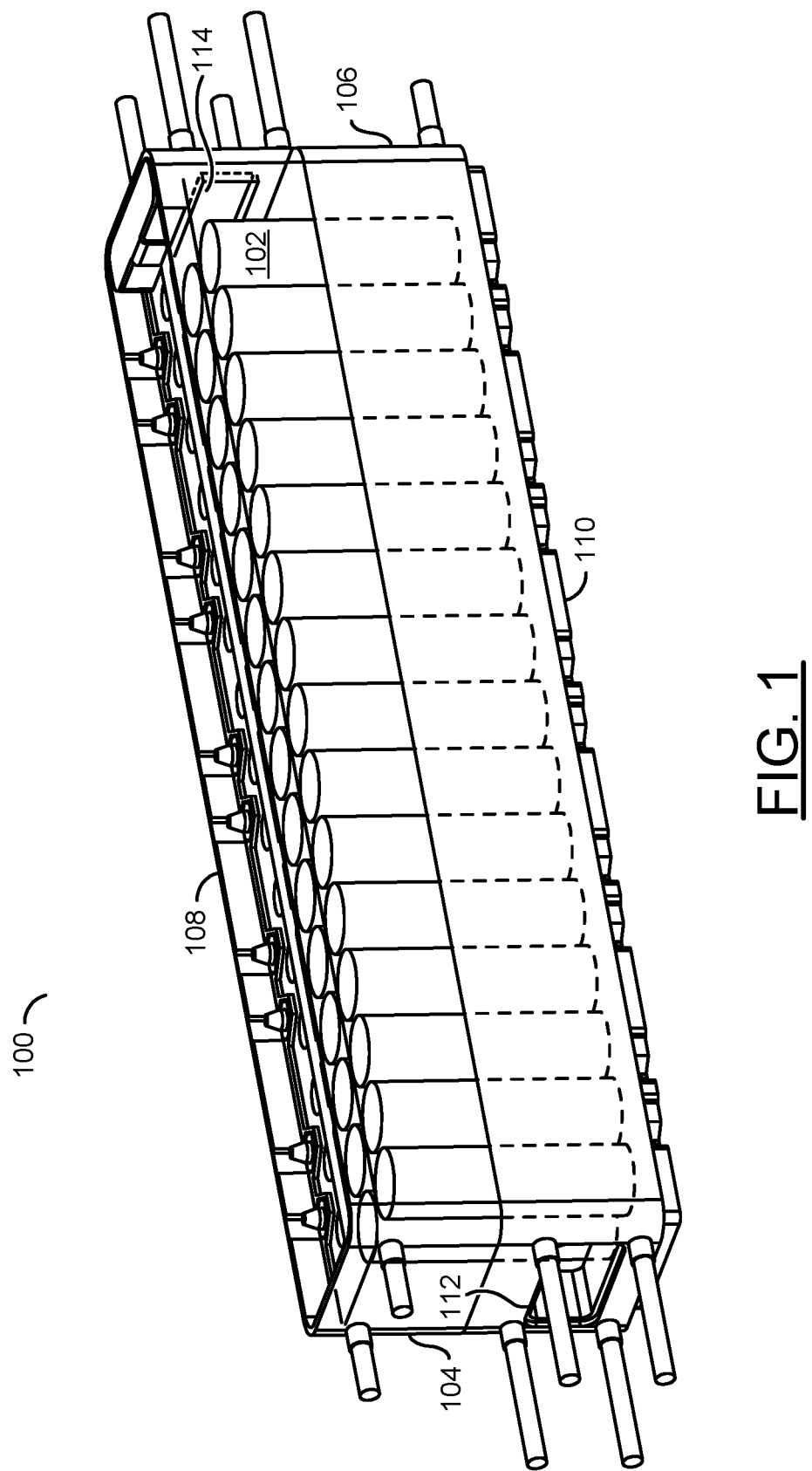
FIG. 1 is a diagram illustrating a battery module in accordance with an example embodiment of the invention.

Embodiments of the present invention include providing a submerged cell modular battery system that may (i) provide battery modules that interconnect to form a battery pack, (ii) be used to form custom battery configurations, (iii) allow a coolant fluid to flow through battery modules to remove heat, (iv) be disassembled and reassembled in different configuration, (v) have high voltage components fully enclosed, (vi) offer flexibility in size and shape, and/or (vii) be used in an electric vehicle.

In various embodiments, a battery pack may be made of uniform modules. In some embodiments, the modules may be assembled into two or more blocks and the blocks may be connected to form the battery pack. Each module may comprise a case which holds rechargeable battery cells and which may be interlocked with other cases to form custom shaped battery packs. The cases may be implemented in a variety of sizes. The cases may be configured to allow a liquid coolant to flow through to provide cooling and to prevent thermal runaway. The liquid coolant may comprise a dielectric fluid configured to absorb heat while preventing unwanted connections between the battery cells. The liquid coolant may also be configured to provide fire suppression. In various embodiments, the liquid coolant flows into one end of a module and out the other end. The flowing fluid takes away heat generated by the battery cells. The present invention eliminates the need to insert separate pipes, tubes, or cooling elements, as found in conventional battery packs.

In various embodiments, the battery cells are submerged in the liquid coolant to offer complete cooling of the battery cells. The cases are modular, which allows for battery packs to be built in a variety of sizes and/or configurations. The battery packs can even be reconfigured after use to change the shape and/or application of the battery pack. In an example, a number of used battery modules configured as an EV airplane battery pack may be disassembled and then reassembled and reconfigured for use in an EV watercraft, stationary storage battery, some other application and/or conventional end of life. In various embodiments, the battery modules are stackable and can be replaced easily for service. Conventional designs do not offer flexibility in the size or shape of the battery pack without re-engineering the modules. The battery modules eliminate a need for a separate case, as all high voltage components are fully enclosed. In an example, the battery modules may be formed using cases having upper and lower halves, which may be bolted, welded, and/or bonded together surrounding the battery cells (e.g., described in more detail below in connection with FIGS. 1-4). In another example, the battery modules may be formed using cases having a lower portion that makes up a majority of the case and an upper portion or cap that completes the case. The upper portion may be welded and/or bonded to the lower portion to enclose the battery cells (e.g., described in more detail below in connection with FIG. 12).

In some embodiments, a two phase cooling process may be implemented. In addition to the liquid coolant flowing into one end of a module and out the other end of the module, a system pressure may be changed to adjust the boiling point of the liquid coolant. In various embodiments, the liquid coolant is provided to the battery pack through pipes and/or hoses, flows through the battery modules which are connected by manifolds that are either attached to or integral to the battery cases, then flows to either a radiator or heat exchanger, and then directed (e.g., using a pump) back to the battery pack. In various embodiments, the battery modules may be assembled (or interconnected or interlocked) together like building blocks, with the cooling fluid flowing from module to module via the attached or integral manifolds. Because the case of the battery module also provides an insulating/structural element, the battery modules may be assembled to form a battery pack without a need for an additional case.

The battery modules may vary in size (e.g., for more power, longer range, etc.). However, each battery pack generally uses battery modules of a single size. The battery modules may be stacked like interlocking building blocks (e.g., like LEGO blocks). In various embodiments, an upper surface of the battery modules includes contours (features) that are configured to mate with complementary contours (features) on a bottom surface of the battery modules. Stacking the modules may make both a mechanical (structural) connection and an electrical connection between modules. In various embodiments, an additional manifold is used to provide the fluid connection between battery modules. However, in some embodiments, the manifold may be formed by manifold portions that are an integrated part of the module cases.

In various embodiments, a cross-over hat is used to connect columns of modules in a battery block or pack. The cross-over hat may be configured to connect the modules in series and/or in parallel. In an example, one side of the cross-over hat includes a contour (features) similar to the top surface of the battery modules and the other side of the cross-over hat has a contour (features) similar to the bottom surface of the battery modules. For serially connected columns of battery modules, the columns are attached to the cross-over hat by rotating one of the columns around both a horizontal axis and/or a vertical axis such that the mating surfaces of the battery modules and the cross-over hat are juxtaposed. In parallel connected columns of battery modules, any even number of columns are connected to the cross-over hat with the same orientation. In some embodiments, the battery modules and cross-over hats may be configured to provide a gap between two columns of modules in a particular battery pack, allowing vehicle components and/or structures to pass through the battery pack.

Boats, planes and cars actually have very similar power requirements. A peak power demand is generally about 500-1000% of a cruising (or continuous) power demand. In an example, a few large battery modules may be used for more even power needs or a larger number of small battery modules may be used in applications where frequent power peaks need to be supplied (e.g., a backup power bank vs. an electric garbage truck).

Referring to FIG. 1, a diagram is shown illustrating a battery module 100 in accordance with an example embodiment of the invention. In various embodiments, the battery module 100 may comprise a plurality of battery cells 102 enclosed in a case. The case may comprise an upper case half 104 and a lower case half 106. The upper case half 104 may have a ridge 108. The lower case half 106 may have a bottom profile 110. The ridge 108 and the bottom profile 110 are generally configured to interlock when two battery modules 100 are stacked together (e.g., see FIG. 5).

In various embodiments, the battery cells 102 may comprise rechargeable battery cells. In various embodiments, the rechargeable battery cells may be implemented using Nickel Cadmium (NiCd), Nickel metal hydride (Ni-M-H), or Lithium ion technology. However, other battery technologies may be utilized to meet the design criteria of a particular implementation. In some embodiments implemented with Lithium ion battery cells, the battery cells 102 may be implemented using cylindrical Lithium ion 18650 cells.

In various embodiments, the upper case half 104 and lower case half 106 are configured to hold the battery cells 102 arranged in N rows of M battery cells, where N and M are integers. In an example, the battery module 100 may be implemented in a variety of sizes having two rows (N=2), with each row having the number of cells (M) being a multiple of 3 (e.g., 6 cells, 12 cells, 18 cells, 30 cells, etc.). In general, a battery module may be implemented with any combination of rows and cells. In an example, a 15 cell module may be implemented with either 3 rows of five cells or five rows of three cells. However, other cell arrangements may be implemented to meet the design criteria of a particular application. In some embodiments, computer techniques may be utilized to obtain an optimized arrangement of the battery cells that does not result in rows.

In various embodiments, the case of the battery module 100 has two ports through which a cooling liquid may flow to remove heat from the battery cells 102. In an example, the lower case half 106 may have a port 112 and the upper case half 104 may have a similar port 114 through which the cooling liquid may flow to remove heat from the battery cells 102 (see FIGS. 1-4). In some embodiments, the ports 112 and 114 may be located in the same case half (e.g., either the upper case half 104 or the lower case half 106). In some embodiments, more than two ports may be implemented to meet design criteria of a particular application. The upper case half 104 and the lower case half 106 may be fastened together using one or more techniques (e.g., bolting, welding, bonding, etc.). In various embodiments, the case may be constructed using a plastic or polymer material (e.g., polystyrene, poly-vinyl-chloride (PVC), poly-carbonate, polyethylene, acrylic, PLEXIGLASS, LEXAN, phenolic resin, etc.). In some embodiments, materials such as liquid crystal polymer, acrylonitrile butadiene styrene (ABS) poly-carbonate alloy (ABS-PC), and other engineering plastics may also be candidates. However, other types of materials may be used to meet the design criteria of a particular implementation.

Figure 2:
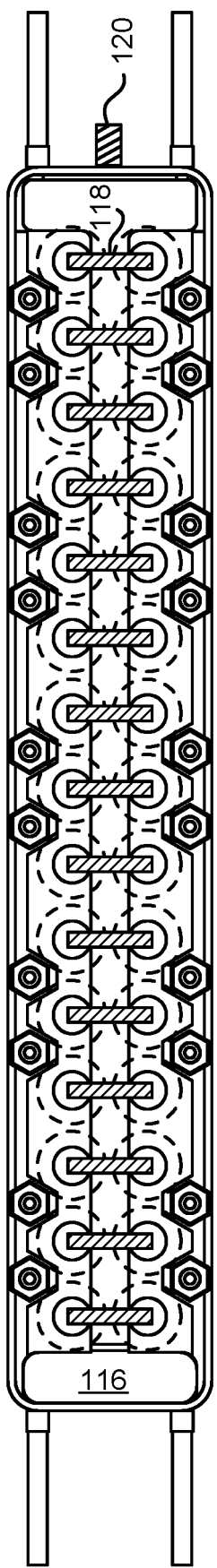
FIG. 2 is a diagram illustrating a battery module in accordance with an example embodiment of the invention.

Referring to FIG. 2, a diagram is shown illustrating a top view of the battery module 100 in accordance with an example embodiment of the invention. An electrode 116 is disposed on the top of the battery module case. The electrode 116 has two end portions that are substantially the same width as the case and are connected by a narrow portion that runs down the center of the battery module 100. The narrow portion is connected to a first terminal of each of the battery cells 102 by a number of straps 118. The electrode 116 may be implemented any conductive material. In various embodiments, the electrode 116 comprises a metal (e.g., copper, aluminum, nickel, etc.) or an alloy thereof. The straps 118 may be implemented with a conductive material that is similar to or different from the material of the electrode 116. The straps 118 may be an integral part of the electrode 116 or may be attached to the electrode 116 by soldering, laser welding, friction welding, ultrasonic welding, TIG welding, MIG welding, or any other method of forming a physical and electrical connection. On one end of the electrode 116, a connector 120 is provided. In some embodiments, the connector 120 is implemented as a threaded stud. In other embodiments, the connector 120 is implemented as a waterproof insulated electrical connector. In various embodiments, the connector 120 may be used to monitor a condition of each module. In an example, an external battery management system (BMS) may be connected to measure a voltage of each module in a battery pack. In various embodiments, the BMS be used to ensure the modules of the battery pack are safe, healthy, and balanced.

Figure 3:
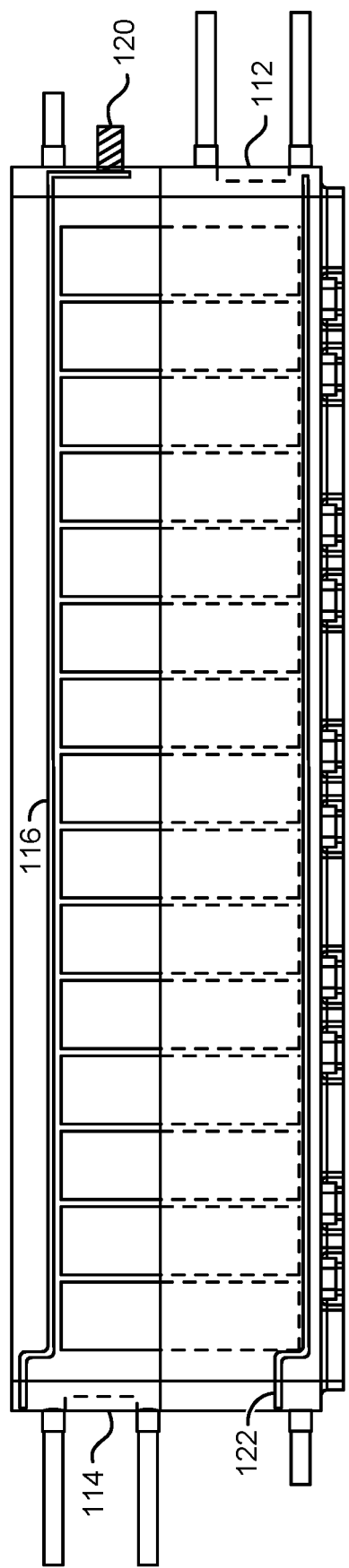
FIG. 3 is a diagram illustrating a battery module in accordance with an example embodiment of the invention.

Referring to FIG. 3, a diagram is shown illustrating a side view of the battery module 100 in accordance with an example embodiment of the invention. In various embodiments, an electrode 122 similar to the electrode 116 is disposed in the bottom of the battery module case to provide a connection to a second terminal of each battery cell 102 in the battery module 100. The electrode 122 may be constructed and connected to the battery cells 102 in a similar manner to the electrode 116. When two battery modules 100 are stacked together (e.g., as illustrated in FIG. 5), the electrode 116 of the lower battery module makes contact with the electrode 122 of the upper battery module, electrically coupling the two battery modules.

Figure 4:
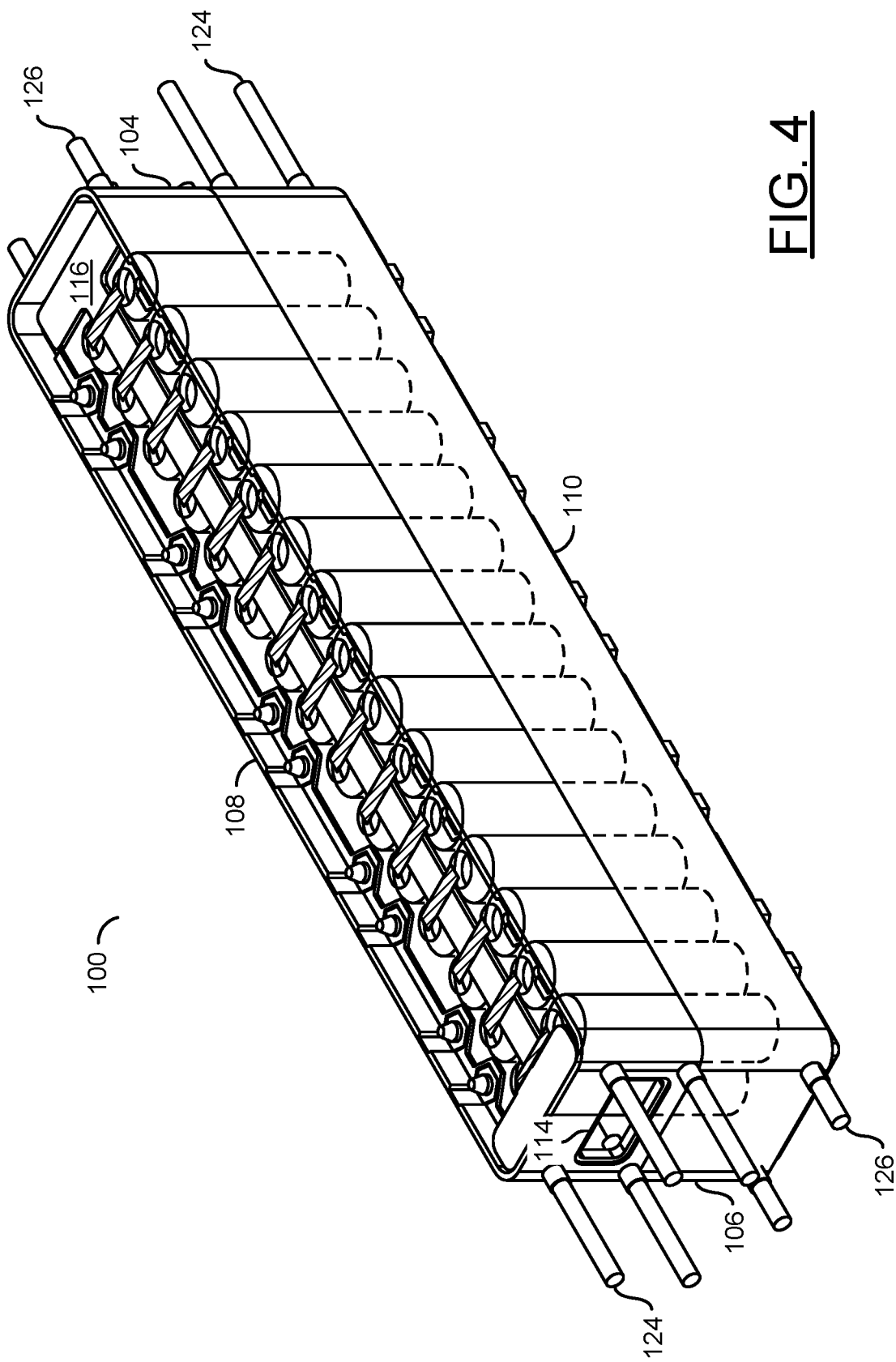
FIG. 4 is a diagram illustrating a battery module in accordance with an example embodiment of the invention.

Referring to FIG. 4, a diagram is shown illustrating a perspective view of the battery module 100 of FIG. 1. In various embodiments, a number of long threaded rods 124 are connected to the battery module around each of the ports 112 and 114. In various embodiments the long threaded rods 124 around each port 112 and 114 are used to connect the battery module 100 to a respective fluid manifold. The ports 112 and 114 generally include a gasket material configured to form a seal with the respective fluid manifolds. In various embodiments, a number of short threaded rods 126 are also connected to the battery module. The short threaded rods 126 may be used to connect the battery module 100 to straps (or brackets) to structural tie columns of battery modules together into a battery block or pack.

Figure 5:
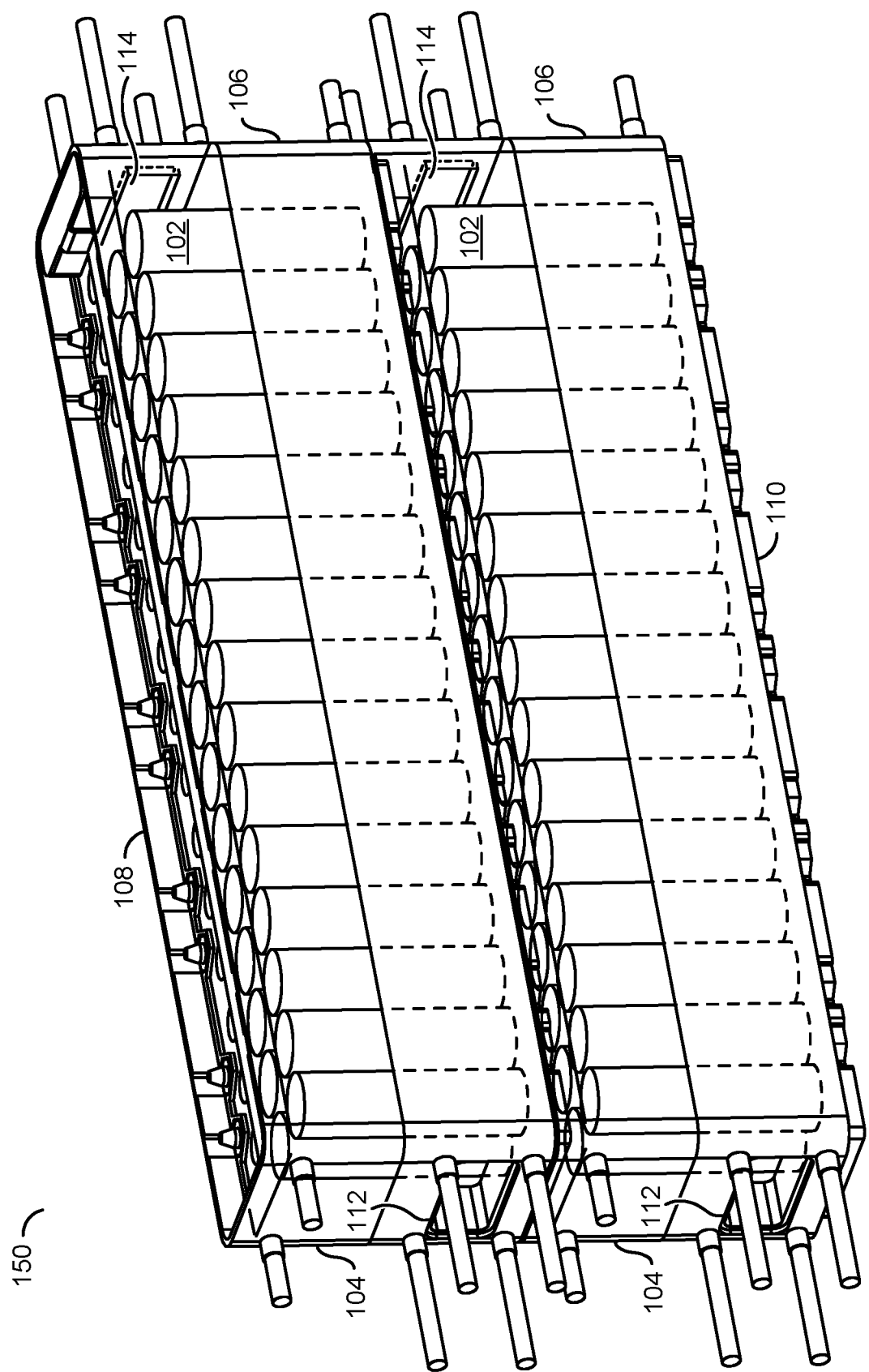
FIG. 5 is a diagram illustrating two battery modules stacked in accordance with an example embodiment of the invention.

Referring to FIG. 5, a diagram is shown illustrating an example of a battery block in accordance with an example embodiment of the invention. In various embodiments, a battery block (or pack) 150 may be formed by stacking battery modules 100 together to form one or more columns. For example, a first battery module 100 may be stacked with a second battery module 100, forming a column. The top ridge 108 of one battery module 100 mates with the bottom profile 110 of the other battery module 100 to form a solid mechanical interconnection (e.g., like LEGO building blocks). With the battery modules 100 mated, the electrodes 116 and 122 of the respective battery packs are placed in contact with one another forming a solid electrical interconnection. A plurality of battery modules 100 may be assembled (stacked) together to form an entire battery pack or a portion of a battery pack (e.g., a battery block).

Figure 6:
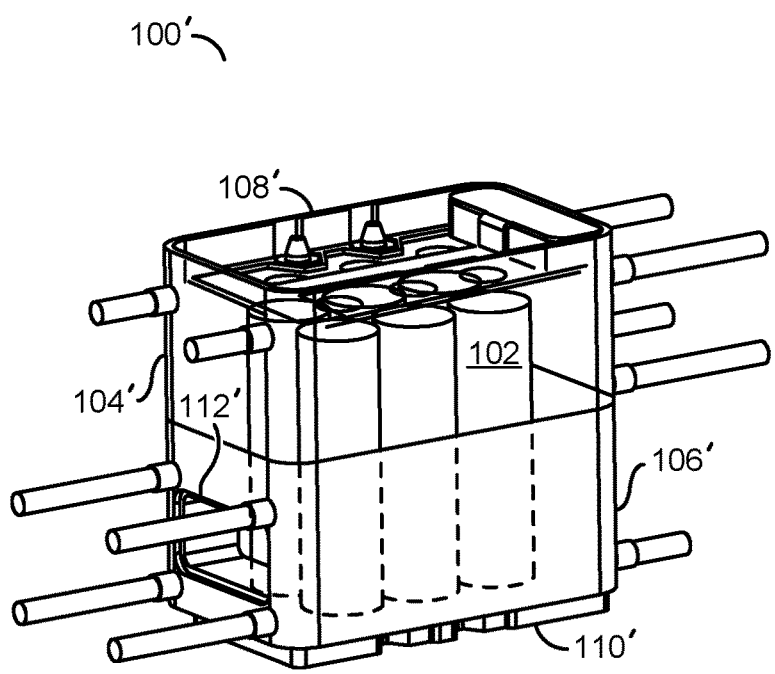
FIG. 6 is a diagram illustrating a 6-cell battery module in accordance with an example embodiment of the invention.

Referring to FIG. 6, a diagram is shown illustrating an example of a 6-cell battery module 100' in accordance with an example embodiment of the invention.

Figure 7:
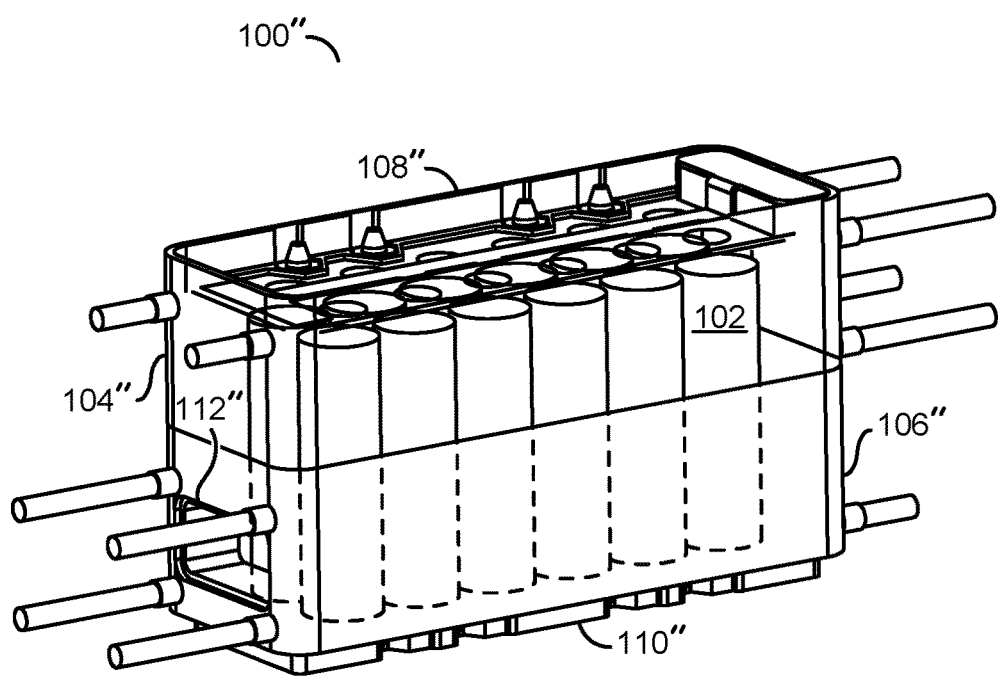
FIG. 7 is a diagram illustrating a 12-cell battery module in accordance with an example embodiment of the invention
Figure 8:
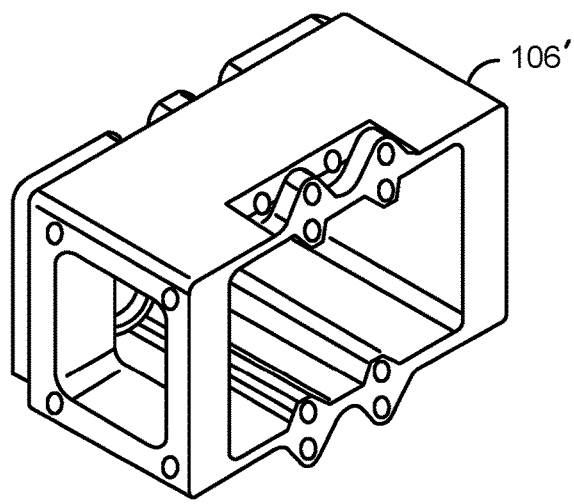
FIGS. 8-11 are diagrams illustrating upper and lower case halves of the 6-cell battery module of FIG. 6.
Figure 9:
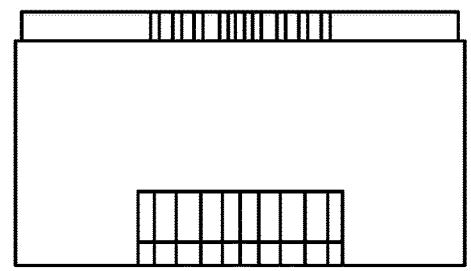
Figure 10:
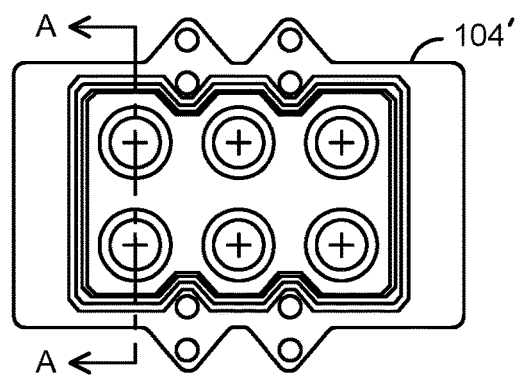
Figure 11:
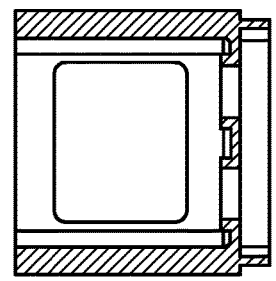

Referring to FIG. 7, a diagram is shown illustrating an example of a 12-cell battery module 100" in accordance with an example embodiment of the invention.

Referring to FIGS. 8-11, diagrams are shown illustrating upper and lower case halves of the 6-cell battery module 100' of FIG. 6. In various embodiments, the battery modules interlock vertically in columns like building blocks. In some embodiments, the upper and/or lower case halves may include protruding tabs that allow the battery modules to be interlocked laterally with adjacent battery modules in other columns. In some embodiments, the holes are disposed in the tabs through which bolts may be passed to assemble a battery module, battery block, and/or battery pack.

Figure 12:
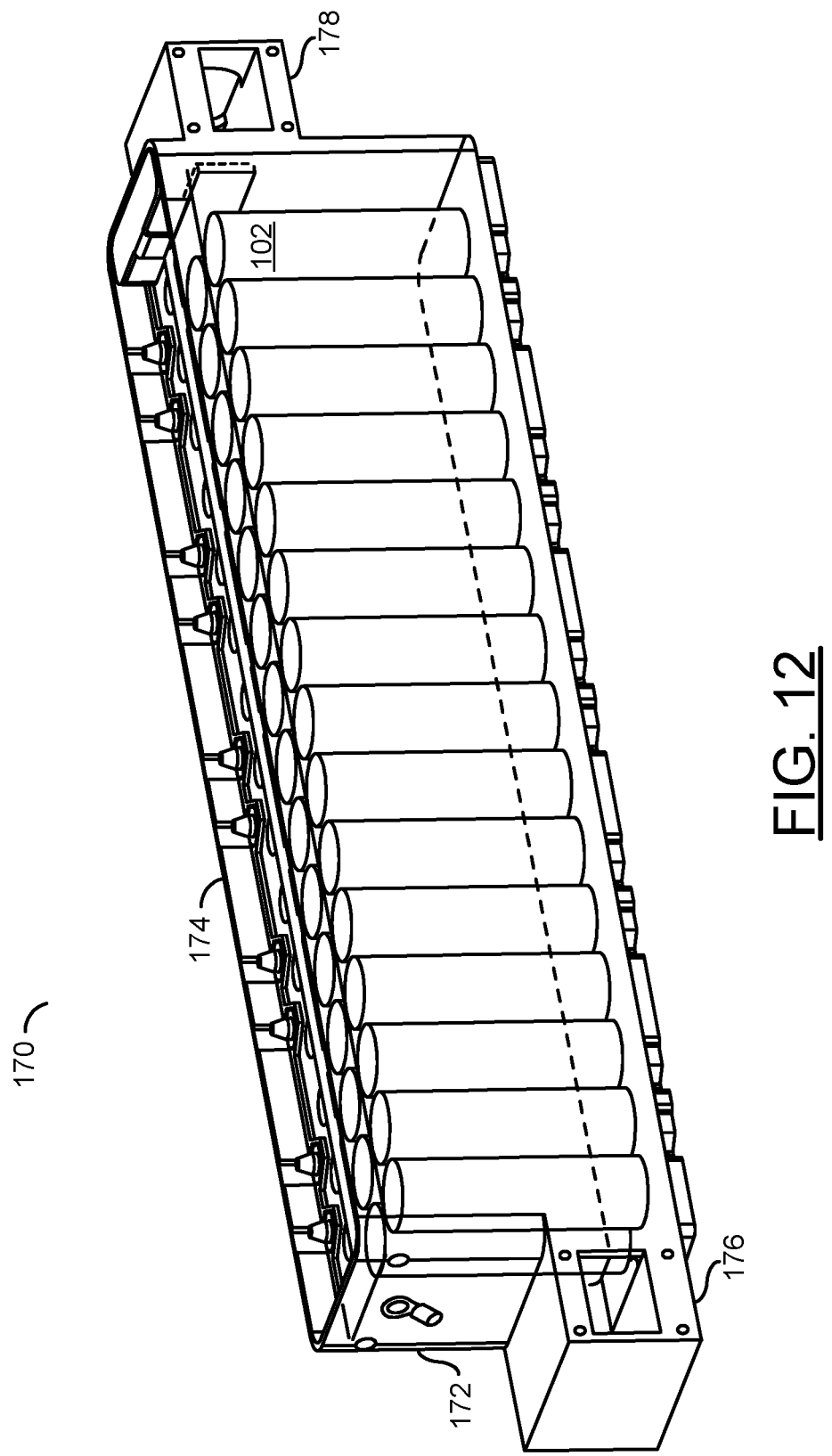
FIG. 12 is a diagram illustrating a battery module in accordance with another example embodiment of the invention.

Referring to FIG. 12, a diagram is shown illustrating a battery module 170 in accordance with another example embodiment of the invention. In various embodiments, the battery module 170 may comprise a case configured to enclose a plurality of battery cells 102. The case may comprise a lower case portion 172 and an upper case portion 174. The lower case portion 172 may comprise the majority of the case surrounding the battery cells 102. The upper case portion 174 may be configured as a cap for enclosing the battery cells 102 in the lower case portion 172. In various embodiments, the case may be constructed using a plastic or polymer material (e.g., poly-styrene, poly-vinyl-chloride (PVC), poly-carbonate, poly-ethylene, acrylic, PLEXIGLASS, LEXAN, phenolic resin, etc.). In some embodiments, materials such as liquid crystal polymer, acrylonitrile butadiene styrene (ABS) poly-carbonate alloy (ABS-PC), and other engineering plastics may also be candidates. However, other types of materials may be used to meet the design criteria of a particular implementation. The upper case portion 174 may be glued, fused, welded, and/or bonded to the lower case portion 172.

In various embodiments, the lower case portion 172 includes integral manifold portions 176 and 178. The integral manifold portions 176 and 178 are configured to form fluid manifolds with adjacent battery modules when assembled into a battery block or battery pack. In some embodiments, the integral manifold portions 176 and 178 are skewed (e.g., on opposite sides of a centerline of the module 170). The skew ensures that the integral manifold portions 176 and 178 can align when two adjacent battery modules 170 are oriented for serial connection. The skew also may ensure better cooling liquid flow over the battery cells. In some embodiments, more than two integral manifold portions may be implemented. In some embodiments, ports may be implemented to provide internal manifold structures. In various embodiments, the integral manifold portions 176 and 178 are configured to allow a gasket material to be disposed between adjacent manifold portions when battery modules 170 are placed next to one another. In an example, the integral manifold portions 176 and 178 may include a groove in which gasket material may be placed prior to or during assembly. The upper surface of the battery module 170 may have a ridge (e.g., similar to the ridge 108 of the battery module 100). The lower surface of the battery module 170 may have a bottom profile (e.g., similar to the bottom profile 110 of the battery module 100). The ridge and the bottom profile of the battery module 170 are generally configured to interlock when two battery modules 170 are stacked together (e.g., similar to the modules shown in FIG. 5).

Figure 13:
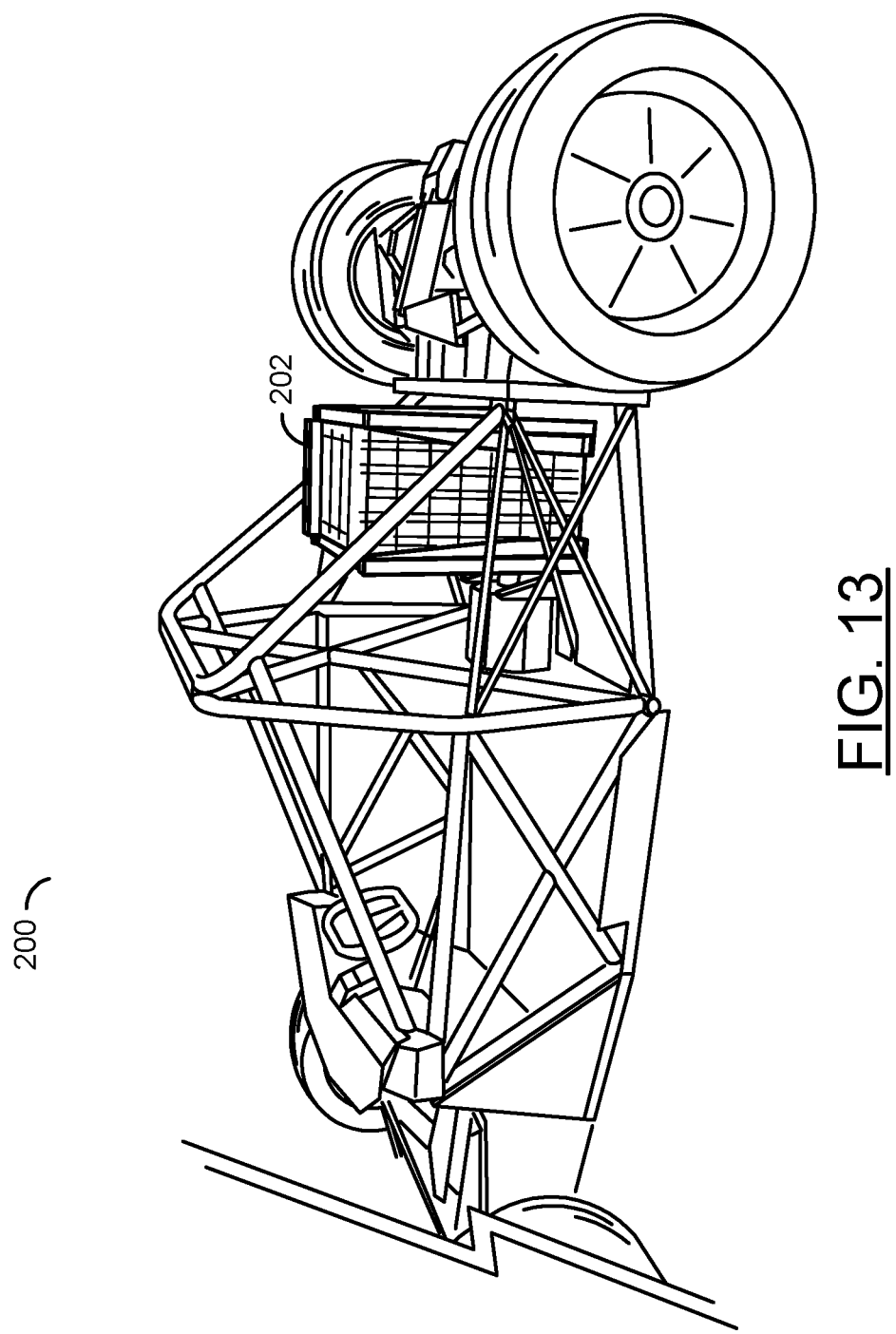
FIG. 13 is a diagram illustrating a side view of a battery pack in accordance with an example embodiment of the invention mounted in an electric vehicle.

Referring to FIG. 13, a diagram is shown illustrating an electric vehicle with a battery pack in accordance with an example embodiment of the invention. In one example, an electric vehicle 200 may be powered by a battery pack 202 implemented in accordance with an example embodiment of the invention. The battery pack 202 may be constructed of a number of battery modules 100 assembled in columns and tied together by cooling fluid manifolds and mounting brackets. The battery pack 202 may be configured to fit an available space in the vehicle 200. In some embodiments, the battery pack 202 may be divided into two or more battery blocks (not shown) depending on the distribution of available space. The battery blocks may be wired and plumbed together to form a complete the battery pack.

In an example, the electric vehicle 200 may have a drive train comprising a 450 volt (V) high power density motor and controller. In an example, the battery pack 202 may be configured to provide 33 kilo-Watt-hours (kWh) at 450V. In an example, the battery pack 202 may comprise one hundred and eight 30-cell battery modules for a total of 3,240 battery cells. The vehicle 200 may be configured to provide cooling (e.g., radiator and coolant system) and recharging (e.g., a SAE J1772 charging system) for the battery pack 202.

Figure 14:
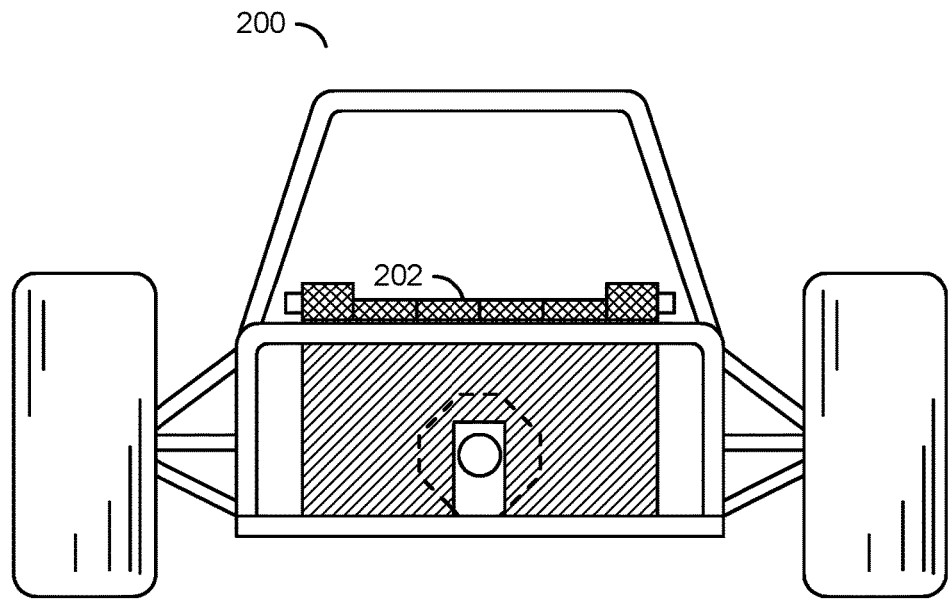
FIG. 14 is a diagram illustrating a rear view of the battery pack of FIG. 13.

Referring to FIG. 14, a diagram is shown illustrating a view of the battery pack 202 from the rear of the vehicle 200. Because the battery pack 202 is constructed of battery modules 100, the battery 202 may be configured to accommodate structures (e.g., a motor shaft) of the vehicle 200.

Figure 15:
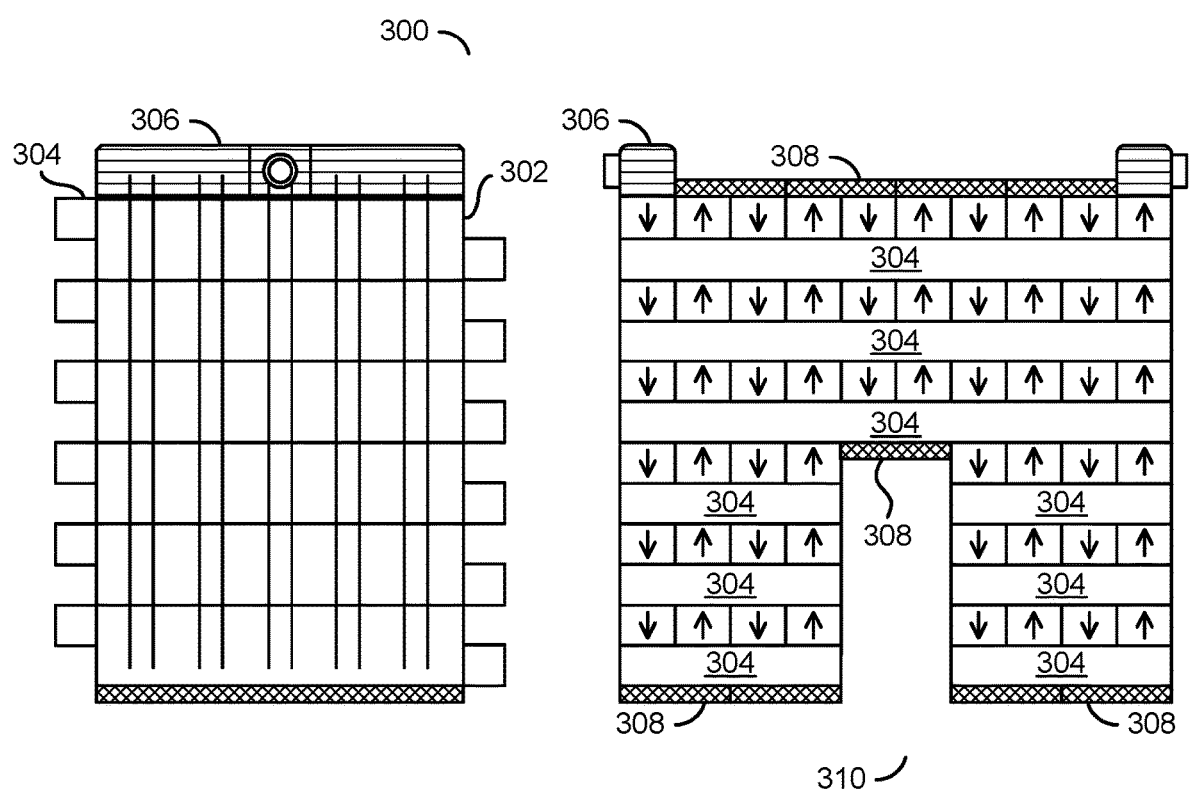
FIG. 15 is a diagram illustrating two views of a battery pack in accordance with an example embodiment of the invention.

Referring to FIG. 15, a diagram is shown illustrating two views of a battery pack 300 in accordance with an example embodiment of the invention. In various embodiments, the battery pack 300 may comprise a plurality of battery modules 302, a plurality of horizontal manifold 304, battery connection caps 306, and a plurality of cross-over hats 308. In some embodiments, the battery pack 300 may also comprise vertical manifolds (not shown for clarity). In embodiments with vertical manifolds, the vertical manifolds may be configured to connect the horizontal manifolds 304. In some embodiments, the vertical manifolds may connect the battery modules in a column and the horizontal manifolds 304 may be used to connect the vertical manifolds. The manifolds are generally connected via hoses and/or pipes to a vehicle cooling system (e.g., radiator, heat exchanger, etc.). In some embodiments, the fluid manifolds may also be internal to the battery modules.

The battery modules 302 may be implemented similarly to the battery modules 100 and 170. The battery modules 302 may be stacked in a number of columns (e.g., ten are shown in FIG. 15). In embodiments implemented with the modules 100, the horizontal manifolds 304 may be bolted to the battery modules 302 of a number of columns using threaded rods attached to the battery modules 302 (e.g., similar to the threaded rods 124 shown in FIG. 4). In embodiments implemented with the modules 170, the horizontal manifolds 304 are formed by integral manifold portions of the battery modules 302 (e.g., similar to the integral manifold portions 176 and 178 shown in FIG. 12). The horizontal manifolds 304 allow cooling fluid to be pumped through all of the battery modules 302 by a cooling system.

In various embodiments, the cross-over hats 308 are used to connect columns of modules together to form a battery block or pack. As shown in FIG. 15, the cross-over hats 308 may be configured to connect the columns of modules in series. However, the cross-over hats 308 may also be configured to connect a number of columns in parallel. In embodiments configured to connect columns in series, one side of the cross-over hat 308 includes a contour (features) similar to the top surface of the battery modules and the other side of the cross-over hat 308 has a contour (features) similar to the bottom surface of the battery modules. For serially connecting columns of battery modules, the columns are attached to the cross-over hat by rotating one of the columns around both a horizontal axis and a vertical axis such that the mating surfaces of the battery modules and the cross-over hat are juxtaposed (e.g., the arrows on each module 302 point to the upper surface of the battery module). In embodiments configured to connect columns of battery modules in parallel, the cross-over hats 308 would have multiple instances of the same contour (features), either upper or lower, and would connect any even number of columns with the same orientation. In some embodiments, the battery modules 302 and cross-over hats 308 may be configured to provide a gap between two columns of modules in a particular battery pack, allowing vehicle components and/or structures to pass through the battery pack.

As shown in FIG. 15, the cross-over hats 308 may be configured to connect two respective columns of battery modules 302 in series (e.g., the arrows on the battery modules 302 may illustrate a current flow of the battery pack 300). The cross-over hats 308 comprise one or more electrodes (e.g., similar to the electrodes 116 and 122 in FIGS. 2-4) for electrically connecting the battery modules 302 on the top or the bottom of the columns. The battery modules 302 and cross-over hats 308 of the battery pack 300 may be arranged (assembled) to provide a gap (or void) 310 allowing the battery pack 300 to fit around structures of a vehicle in which the battery pack 300 is mounted. The connection caps 306 comprise one or more electrodes (e.g., similar to the electrodes 116 and 122 in FIGS. 2-4) for electrically connecting the battery modules 302 of the battery pack 302 to a vehicle, prime mover, electrical system, etcetera. When the battery modules, 302, the connection caps 206 and the cross-over hats 308 are assembled, all high voltage components of the battery pack 300 are fully enclosed.

Figure 16:
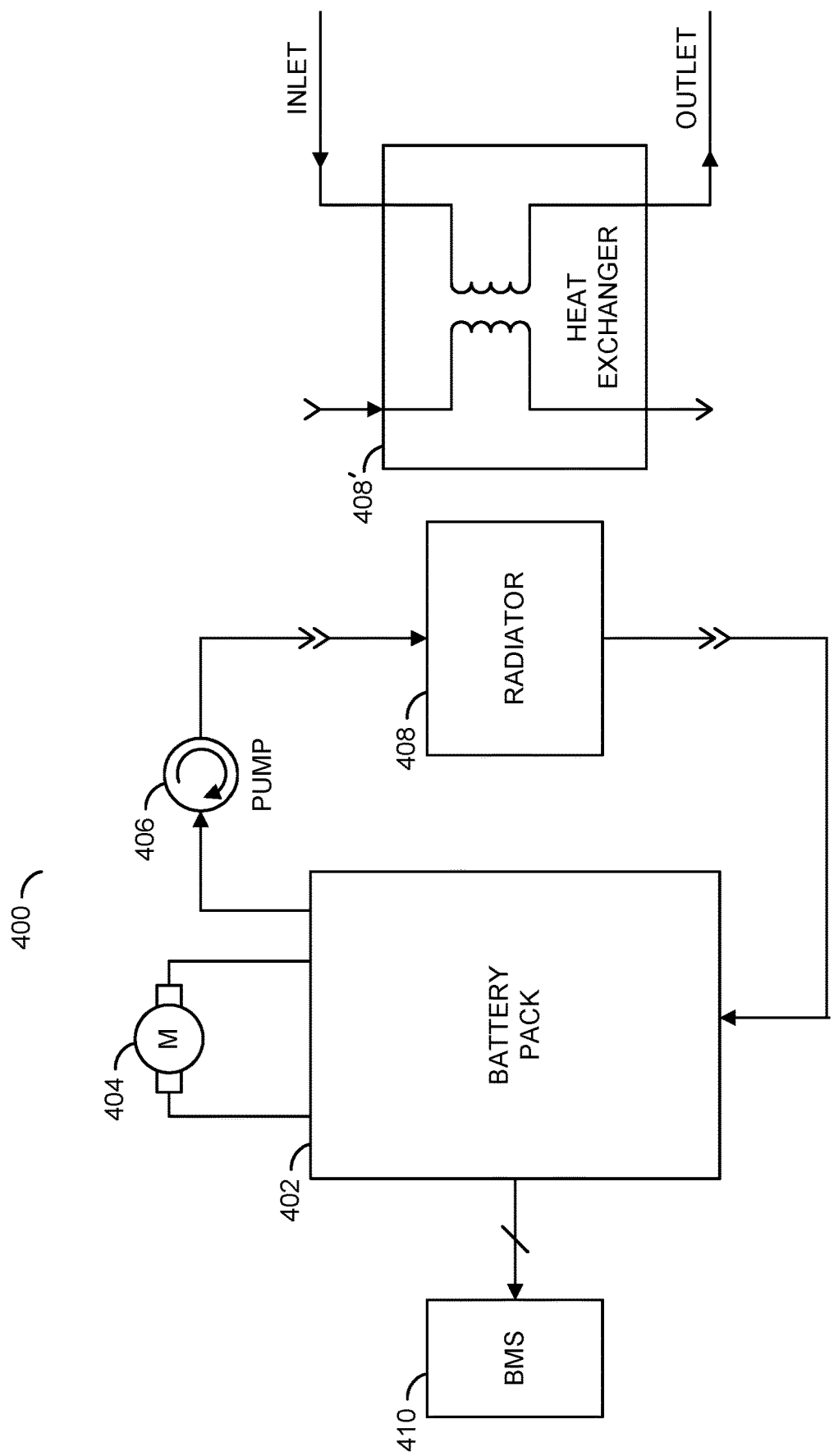
FIG. 16 is a diagram illustrating an electric vehicle battery system in accordance with an example embodiment of the invention.

Referring to FIG. 16, a diagram is shown illustrating an electric vehicle battery system 400 in accordance with an example embodiment of the invention. In various embodiments, the electric vehicle battery system 400 comprises a battery pack 402, a motor assembly 404, a pump assembly 406, and a radiator 408. The battery pack 402 may be configured primarily based upon energy demands of the motor 404. The configuration of the battery pack 402 may also take into account any other energy demands of the electric vehicle. Although shown as a single unit, the battery pack 402 may be divided into two or more battery blocks, each comprising one or more battery modules, which are electrically coupled and plumbed together (e.g., with wires, pipes and/or hoses). In various embodiments, the motor assembly 404 may be implemented with an alternating current (AC) electric motor. In various embodiments, direct current (DC) energy from the battery pack 402 may be converted to AC using either conventional (e.g., inverter, etc.) or yet to be developed techniques.

In various embodiments, the pump assembly 406 and the radiator 408 are configured to move cooling fluid through the battery pack 402 to prevent overheating and thermal run-away. The cooling fluid may also provide a fire suppression capability. In various embodiments, the battery pack 402, the pump assembly 406, and the radiator 408 are configured as a closed loop system. In some embodiments, a two phase cooling process may be implemented. In addition to the liquid coolant flowing into one end of a module and out the other end of the module, a system pressure may be changed to adjust the boiling point of the liquid coolant. In embodiments where the battery pack 402 is configured to power an electric watercraft (e.g., a water ski boat, jet ski, etc.), the radiator 408 may be replaced by a heat exchanger 408'. In an example, the heat exchanger 408' may be implemented as part of an open loop cooling system that uses lake water as a heat sink.

In various embodiments, the battery pack 402 may also be connected to a battery management system (BMS) 410. In various embodiments, the BMS 410 is enabled to monitor voltage and temperature of each battery module in the battery pack 402 and ensure the voltage and temperature stay within predetermined (e.g., safe) limits. The battery modules of the battery pack 402 may include an interface (e.g., connector, terminal, etc.) facilitating connection to the BMS 410 (e.g., using wires).

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a plurality of battery cells;
   a rectangular case configured to hold the plurality of battery cells;
   a plurality of spaced-apart straps, the spaced-apart straps being electrically conductive, each of the plurality of spaced-apart straps interconnecting an adjacent group of battery cells of the plurality of battery cells;
   a first electrode connected to a first terminal of each of said battery cells by at least one of the plurality of spaced-apart straps, wherein said at least one of the plurality of spaced-apart straps is directly connected to the first terminal and the first electrode, the first electrode exposed on an upper surface of the case;
   a second electrode connected to a second terminal of each of said battery cells and exposed on a lower surface of the case, wherein (i) the case has at least one first port disposed in a first end and at least one second port disposed in a second end, said first and said second ports configured to allow a cooling liquid to flow through the case from said first end to said second end with the battery cells submerged in the cooling liquid, (ii) a ridge is formed around a periphery of and extends perpendicular to an upper surface of the case, (iii) the case has a bottom profile configured to interlock with the ridge of the upper surface such that, when a first case is interlocked with a second case, the first electrode of the second case is in contact with the second electrode of the first case to electrically and physically connect the first and second cases into a battery block or battery pack.

2. The apparatus according to claim 1, wherein the battery cells are rechargeable.

3. The apparatus according to claim 1, wherein the case comprises a bottom portion including at least the first port and a top portion.

4. The apparatus according to claim 3, wherein the top portion constitutes a half of the case and includes at least the second port.

5. The apparatus according to claim 3, wherein the bottom portion and the top portion are joined together by one or more of being bolted, being glued, being fused, being welded, and being bonded.

6. The apparatus according to claim 1, wherein the case further comprises one or more tabs configured to form one or more rabbet joints with the second case.

7. The apparatus according to claim 1, wherein the ports are configured to form a seal with a separate manifold.

8. The apparatus according to claim 7, wherein the manifold is connected to a plurality of cases of the battery pack.

9. The apparatus according to claim 8, wherein the manifold comprises one or more horizontal conduits, each connected to the cases of a respective layer of the battery pack.

10. The apparatus according to claim 9, wherein the manifold comprises one or more vertical conduits connecting with the horizontal conduits connected to the cases of the respective layers of the battery pack.

11. The apparatus according to claim 10, wherein the manifold, a pump, and at least one of a radiator and a heat exchanger are connected together forming a cooling system for the battery pack.

12. An electric vehicle battery pack comprising:
   a plurality of battery modules, each comprising:
      a plurality of battery cells, and
      a plurality of spaced-apart straps, the plurality of spaced-apart straps being electrically conductive, and interconnecting an adjacent group of battery cells of the plurality of battery cells,
   wherein each of said battery modules comprises a rectangular case configured to hold the plurality of battery cells, a first electrode is connected to a first terminal of each of the battery cells in the case by one of the plurality of spaced-apart straps wherein said at least one of the plurality of spaced-apart straps is directly connected to the first terminal and the first electrode, the first terminal exposed on an upper surface of the case, a second electrode is connected to a second terminal of each of the battery cells in the case and exposed on a lower surface of the case, the case has at least one first port disposed in a first end and at least one second port disposed in a second end, the first and the second ports are configured to allow a cooling liquid to flow through the case from the first end to the second end with the battery cells submerged in the cooling liquid, a ridge is formed around a periphery of and extends perpendicular to the upper surface of the case, the case has a bottom profile configured to interlock with the ridge of the upper surface such that, when a first case is interlocked with a second case, the first electrode of the second case is in contact with the second electrode of the first case to electrically and physically connect the first and second cases;
   a plurality of manifolds attached to the columns of battery modules, said manifolds configured to allow cooling liquid to flow through the battery modules and in contact with the battery cells; and
   one or more cross-over hats, wherein (a) each of the one or more cross-over hats comprises one or more of (i) a ridge and electrode connection matching the upper surface of one of the battery modules and (ii) a profile and electrode connection matching the bottom profile of one of the battery modules, and (b) the one or more cross-over hats connect either a pair of battery modules on a bottom of one or more pairs of columns or a pair of battery modules on a top of the one or more pairs of columns.

13. The electric vehicle battery pack according to claim 12, wherein the battery modules are arranged to fit an available battery space of an electric vehicle.

14. The electric vehicle battery pack according to claim 12, wherein the battery modules are arranged to fit around one or more vehicle components.

15. The electric vehicle battery pack according to claim 12, wherein the battery modules are sized to meet an expected power demand of at least one of an electric car, an electric truck, an electric boat, and an electric airplane.

16. The electric vehicle battery pack according to claim 15, wherein a size of the battery modules is selected based on at least one of a peak power specification and a continuous power specification.

* * * * *